May 20, 1930.  F. H. KAMPMAN  1,759,355
AUTO ACCELERATOR REGULATING DEVICE
Filed June 8, 1929  2 Sheets-Sheet 1

INVENTOR.
Frederick H. Kampman
BY Myron J. Dikeman
ATTORNEY.

May 20, 1930. F. H. KAMPMAN 1,759,355
AUTO ACCELERATOR REGULATING DEVICE
Filed June 8, 1929 2 Sheets-Sheet 2

INVENTOR.
Frederick H Kampman
BY
Myron J Dikeman
ATTORNEY.

Patented May 20, 1930

1,759,355

UNITED STATES PATENT OFFICE

FREDERICK H. KAMPMAN, OF DETROIT, MICHIGAN

AUTO ACCELERATOR-REGULATING DEVICE

Application filed June 8, 1929. Serial No. 369,470.

My invention relates to a speed regulating device for automobiles.

The object of my invention is to provide a mechanical device that can be readily attached to an automobile for limiting and regulating the movement of the accelerator pedal.

Another object is to provide a pedal regulating device that can be operated directly from the auto instrument board, and set for any desired auto speed.

A further object is to produce a pedal regulating device that is operative by rotatable cam means, capable of readjustment for various desired speed limits.

A still further object is to produce a speed regulator that can be easily attached to an automobile at any time, that can be easily and efficiently operated and can be manufactured at a very low cost.

These several objects are attained in the preferred form by the construction and arrangement of parts more fully hereinafter set forth.
Similar parts on all drawings are marked by similar numerals or letters.

Figure 2:
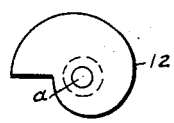
Fig. 2 is an end view taken on the line 2—2 of the Fig. 1 showing the operating cam.
Figure 3:
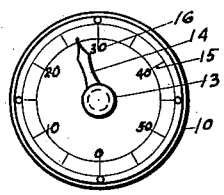
Fig. 3 is an end view taken on the line 3—3 of the Fig. 1 showing the instrument board dial and operating knob.
Figure 1:
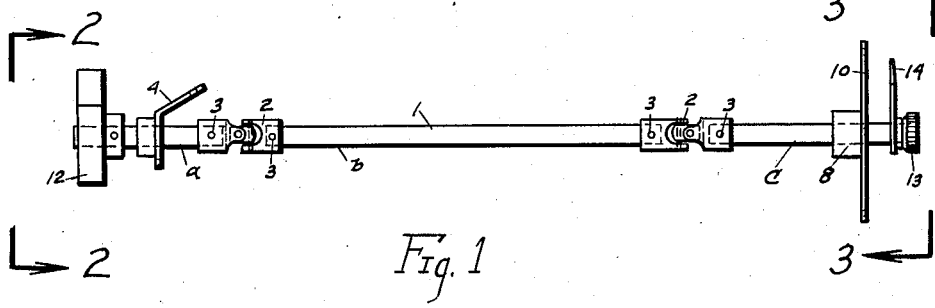
Fig. 1 is a side view of an assembled section of my device showing the relative position of the operating parts.
Figure 4:
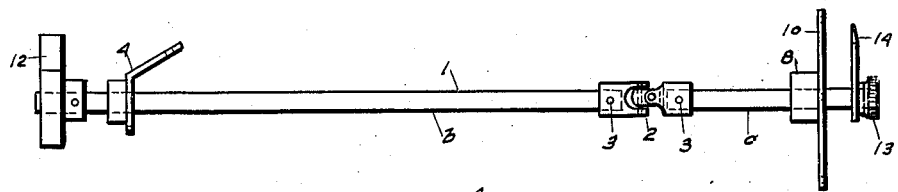
Fig. 4 shows an alternate form of my device with one of the universal joints omitted.

I will now describe my device more fully, referring to the drawings and the marks thereon.

In general my device comprises an operating cam fixedly attached to a rotatably mounted operating shaft, and positioned at one side of the auto accelerator pedal, for engaging the pedal at all positions of the cam, and in a manner to limit the pedal movement as desired, by changing the position of the cam therewith.

Figure 6:
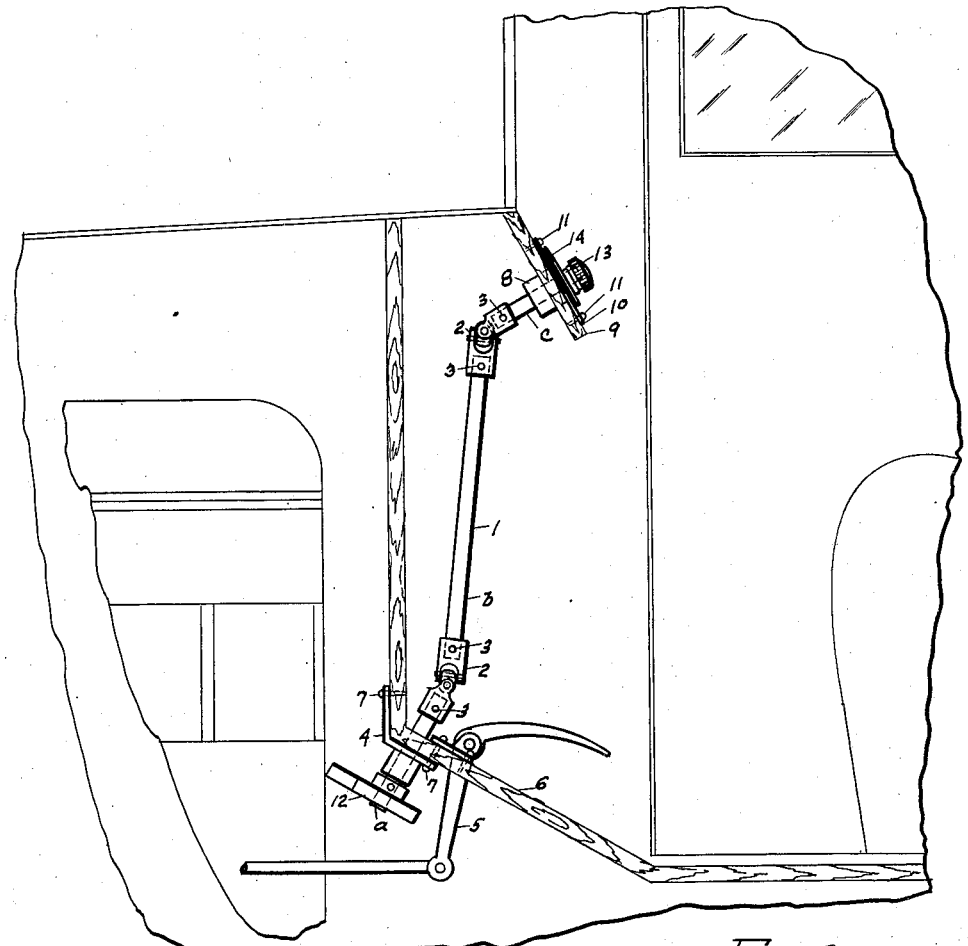
Fig. 6 shows my device when fully installed within an automobile body as applied to the auto accelerator pedal.

The operating shaft —1— is preferably made of jointed sections —a—, —b—, and —c—, connected together by universal joints —2— of any suitable or standard type. The universal points —2— are securely attached to the shaft sections —a—, —b—, and —c— by the pins —3—, or by any other means for securely attaching the joints thereto, and provide means for rotatably mounting the shaft sections in different relative positions. The shaft section —a— is provided with a support bearing —4—, suitable for rigidly mounting on the floor board of an auto body adjacent to the auto accelerator pedal —5—, either in front or to one side thereof, depending upon the type of accelerator pedal with which it is to be used. The bearing —4— being attached to the auto foot board —6— by the screws —7— in the ordinary manner, the bearing preferably being attached thereto on the under side of the board, although it may be mounted on the top side thereof if desired. The shaft section —c— is also provided with a suitable support bearing —8— for rigidly mounting on the auto instrument board —9—, the bearing —8— being preferably formed with a projecting dial flange —10— around the outer surface thereof, and positioned concentric with the bearing, and is fixedly attached to the auto instrument board by the screws —11—. The shaft section —b— being of a sufficient length to connect both rotatably mounted sections —a— and —c— together when installed within an automobile body, and will vary in length depending upon the type of auto in which it is to be installed. The entire operating shaft —1— being capable of rotation when mounted within an instrument board and foot board of an auto as illustrated in Fig. 6 of the drawings. At the outer end of the shaft section —a— is mounted a disc spiral cam —12—, fixedly attached thereto and positioned at right angles to the shaft section, and rotatable therewith. Both the shaft section and cam being positioned to provide direct contact between the spiral cam surface and the auto accelerator pedal —5—, and from the direction the pedal is moved. By rotating the cam —12— on the operating shaft —1— the pedal movement may be varied and regulated as desired, and the speed limit of the automobile regulated accordingly. Fixedly mounted on the outer end of the shaft section —c— is an operating knob —13—, providing means for rotating the shaft —1— and attached spiral cam —12— directly from the instrument board of the car, turning the cam —12— to any position and limiting the auto speed as desired. Fixedly attached to the operating knob —13— is an indicator hand —14—, radially positioned over and adjacent the outer surface of the dial flange —10—, designed to indicate the exact relative position of the spiral cam —12— to the adjacent auto accelerator pedal —5— with which it engages. The dial flange —10— is formed with a series of radially positioned graduations —15—, designed and calibrated to represent the speed of the auto travel, but which would vary with different types of cars, the speed of the auto being indicated in miles per hour by the numerals —16—. The numerals —16— are preferably attached or stamped thereon, by actual trial drives of the auto after installation of the device thereon.

For a cheeper installation, the lower universal joint —2— may be omitted, although the cam —12— will engage the accelerator pedal at a slightly different angle, the operation of the device will be the same as heretofore described.

Figure 5:
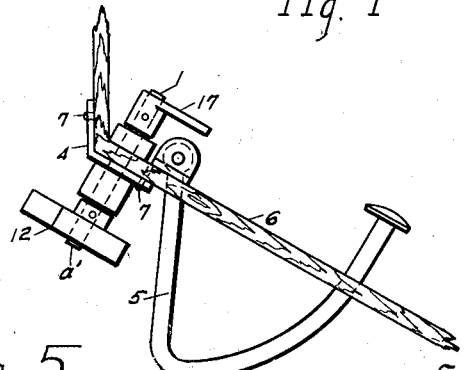
Fig. 5 shows a further modification of my device as applied to an automobile accelerator pedal but with the instrument board connections omitted.

Fig. 5 illustrates a modified form of my device, utilizing the short shaft section —a'— with the cam —12— attached as heretofore described, and rotatably mounted on the auto foot board —6— by a suitable support bearing —4—, the universal joint —2— being replaced by a small operating handle —17— securely attached to the upper end of the shaft, providing means for turning the spiral cam —12— to any desired relative position to the auto pedal —5—. The operation and results are the same as heretofore described.

Figure 7:
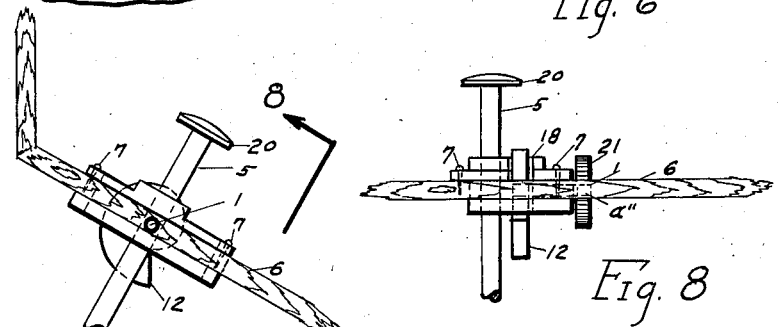
Figs. 7 and 8 illustrate a modified form of my device when the regulating cam is applied to the pin type of auto accelerator pedal, and the instrument board connections being omitted.
Figure 8:
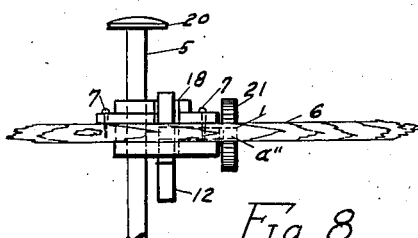

Figs. 7 and 8 illustrate the application of the same type of spiral cam when applied beneath the head of a pin type of auto accelerator pedal. The short shaft section —a''— is mounted in a horizontal floor bearing —18—, attached to the auto foot board —6— by the screws —7—. The spiral cam surface of cam —12— being positioned to engage the pin head —20— when pressed downward by the operator. A foot operating wheel —21— is fixedly mounted on the outer end of the shaft section —a''— in place of the universal joint —2— providing means for turning the cam —12— to various relative positions beneath the accelerator pin head —20—, likewise for limiting the movement thereof, and also limit the speed of the automobile accordingly as heretofore described.

Having fully described my automobile accelerator regulating device, what I claim as my invention and desire to secure by Letters Patent is:

1. A cam regulating device adapted to be installed within an auto body for limiting the movement of the auto accelerator pedal and to be used in combination therewith, comprising an operating shaft suitable for mounting between the instrument board and the foot board of an automobile, suitable bearings for attaching to the auto body walls for rotatably mounting said operating shaft therein, a disc spiral cam fixedly attached to one end of said operating shaft, both bearings and shaft being so positioned as to place the spiral cam in line with the movement of the auto accelerator pedal to engage and regulate the movement thereof, and means mounted on the instrument board of the auto connected to the operating shaft for rotating the attached spiral cam to any desired relative position with the pedal.

2. A cam regulating device adapted to be installed within an auto body for limiting the movement of the auto accelerator pedal and to be used in combination therewith, comprising an operating shaft suitable for mounting in the auto body between the auto foot board and instrument board, suitable shaft bearings for attaching to the auto foot board and instrument board for rotatably mounting the said operating shaft thereon, a disc spiral cam fixedly attached to the lower end of said operating shaft at right angles thereto and rotatable therewith, both shaft and bearings being positioned to place the spiral cam edge in line with the movement of the auto accelerator pedal for engaging and regulating the movement thereof, means mounted on the auto instrument board connected to the operating shaft for rotating same with the connected spiral cam to various desired positions of said cam with the accelerator pedal.

3. A cam regulating device adapted to be installed within an auto body for engaging and limiting the movement of the auto accelerator pedal to be used in combination therewith, comprising an operating shaft of jointed sections suitable for mounting between the instrument board and foot board of an auto, suitable shaft bearings for mounting on both instrument board and foot board for rotatably mounting said operating shaft therein, a disc spiral cam fixedly attached to the lower end of said operating shaft, at right angles thereto and rotatable therewith, both shaft and supporting bearings being positioned to place the spiral cam edge in line to engage the auto accelerator pedal to limit and regulate the movement thereof, a graduated dial mounted on the instrument board encircling the upper end of the operating shaft and a turning handle with indicator attached mounted on said operating shaft adjacent said graduated dial for turning and indicating the relative positions of the spiral cam to the engaging surface of the auto accelerator pedal.

In witness whereof, I sign these specifications.

FREDERICK H. KAMPMAN.